United States Patent
Gillis (10) Patent No.: US 6,652,208 B2
(45) Date of Patent: Nov. 25, 2003

(54) FASTENER DEVICE AND METHOD FOR ATTACHING A PANEL OF SEMI-RIGID MATERIAL TO A SUBSTRATE

(76) Inventor: Macdonald Joseph Gillis, 70 Milton St., Sydney, Nova Scotia (CA), B1P 4L8

( * ) Notice: Subject to any disclaimer, the term of this patent is extended or adjusted under 35 U.S.C. 154(b) by 0 days.

(21) Appl. No.: 09/948,655

(22) Filed: Sep. 10, 2001

(65) Prior Publication Data

US 2002/0015627 A1 Feb. 7, 2002

Related U.S. Application Data

(63) Continuation-in-part of application No. 09/536,130, filed on Mar. 28, 2000, now abandoned.

(30) Foreign Application Priority Data

Apr. 8, 1999 (CA) ............................................... 2268252
Mar. 13, 2001 (CA) ............................................... 2340590

(51) Int. Cl.[7] ............................................... F16B 39/00
(52) U.S. Cl. ........................ 411/107; 411/389; 411/386
(58) Field of Search .............................. 411/107, 395, 411/400, 401, 389, 411, 386; 52/512, 410; 44/387.4

(56) References Cited

U.S. PATENT DOCUMENTS

| 4,584,814 A | 4/1986 | Hounsel |
| 4,662,807 A * | 5/1987 | Lien |
| 4,680,913 A * | 7/1987 | Geisen |
| 4,756,653 A | 7/1988 | Berger |
| 4,762,453 A | 8/1988 | DeCaro |
| 4,846,622 A * | 7/1989 | Lien |
| 4,881,861 A * | 11/1989 | Hewison |
| 4,917,554 A | 4/1990 | Bronn |
| 5,177,922 A | 1/1993 | Ovaert et al. |
| 5,426,905 A | 6/1995 | Rollhauser et al. |
| 5,630,688 A * | 5/1997 | Tran |
| 5,639,195 A | 6/1997 | Brabston et al. |
| 6,095,736 A * | 8/2000 | Miller |
| 6,167,663 B1 * | 1/2001 | Nakamoto |

* cited by examiner

Primary Examiner—Flemming Saether
(74) Attorney, Agent, or Firm—Jones, Tullar & Cooper, P.C.

(57) ABSTRACT

A fastener device for attaching a rear face of an acoustic panel to a substrate, comprising an anchor part for attachment to the substrate and a screw part having an inner end rotatably held by the anchor part. The screw part has a helical member with an outer end capable of penetrating the rear face of the panel when rotated by an elongated drive rod projecting from the outer end. The drive rod can penetrate a panel and is accessible from the front face of the panel to cause the helical member to penetrate and engage a rear portion of the panel, and to secure the panel onto the substrate. The drive rod is removable from the outer end of the screw part after the panel has been secured so that the fastener is essentially concealed within the panel.

16 Claims, 11 Drawing Sheets

FASTENER DEVICE AND METHOD FOR ATTACHING A PANEL OF SEMI-RIGID MATERIAL TO A SUBSTRATE

CROSS-REFERENCE TO RELATED APPLICATION

This application is a continuation-in-part of my U.S. Ser. No. 09/536,130, filed Mar. 28, 2000 now abandoned.

BACKGROUND OF THE INVENTION

1. Field of the Invention

The present invention relates to a device for fastening a panel of semi-rigid material, such as a so-called acoustic panel having a decorative face, to a substrate such as a wall or ceiling. The term "semi-rigid" is used for materials such as fiberglass (glass fiber reinforced resin), or other fibrous material, used in buildings for heat or sound insulation. Such materials are structurally weak but are capable of receiving special fasteners designed to be used with such material. The panels with which the present invention is primarily concerned usually have a decorative face and it is desired that any fastener used should be a so-called "blind" fastener which is hidden and does not noticeably spoil the appearance of the face.

2. Prior Art

Many different fastening devices and methods have been used hitherto with acoustic panels or similar panels, in a manner which does not affect the appearance of the panel.

In some cases plain, unmodified panels have been attached to a wall by glue or resin spots, or have been impaled onto the spikes of special impaling clips or fasteners. The impaling-type fasteners often need the addition of glue to hold properly. The use of glue means that the panel cannot be removed or re-adjusted in position without practically destroying the panel.

The impaling spikes usually slope upwards, to better hold the panel. This has the drawback that the panel must move downwards during its installation, so that a gap or "reveal" must occur between the top of a panel and a ceiling.

In other devices, a fastener part is attached to the rear of a panel, and mated with another fastener part attached to the wall. The fastening devices may involve metal clips such as so-called Z-clips, magnets, "Velcro" type fasteners, or concealed splines and tracks. These require time in the factory to attach the fastener portion to the panel, and care must be taken to properly align the wall portion of the fasteners with the panel part; for these reasons I prefer to avoid any component which needs prior attachment to the panels. The Z-clips need a downwards motion during installation and therefore also give a reveal. Some such fasteners, such as the "Velcro" type, do not hold strongly enough to be used on large panels or to hold panels to ceilings.

Although the semi-rigid material of these panels is too weak to hold ordinary wood screws, some special screws or fasteners have been designed for fiberglass insulation, for example as shown in the following U.S. patents:

No. 4,762,453, issued Aug. 9, 1988 to DeCaro,
No. 4,917,554, issued Apr. 17, 1990 to Bronn, and
No. 5,426,905, issued Jun. 27, 1995 to Rollhauser et al.

The screws or fasteners shown in these patents have large heads and are therefore unsuitable for use where a hidden or unobtrusive fastener is needed.

U.S. Pat. No. 4,846,622, issued Jul. 11, 1989 to Lien, describes a securing device for a hollow plastic frame part such as a window frame. The device includes a screw part which is rotatably attached to a substrate by an anchor screw, and which can be rotated to engage with an internally threaded holding element attached to the frame, rotation of the screw part being effected by a non-circular rod inserted through a bore in the outer face of the frame. This would not be a suitable construction for my purposes, firstly since it requires that the holding element be attached to the frame by a small screw before installation. Quite apart from the fact this kind of screw could not be used with semi-rigid material, as indicated above it is desired in the present invention to avoid use of any parts which need prior attachment to the acoustic panels. Also, Lien does not show a hidden fastener; he has a bore in the outer face of his frame which is quite noticeable, and which in accordance with his construction must be larger than the head of his anchor screw to accommodate the non-circular rod. In fact, this bore shown by Lien is almost twice the diameter of his anchor screw.

SUMMARY OF THE INVENTION

The present invention resulted from a need for an improved fastener, especially for acoustic or insulating panels made of semi-rigid material, the fastener having at least some of the following advantages over current fasteners:

1. It provides a strong hold on the panel so as to be suitable for holding ceiling panels;
2. It does not require the addition of any part by the panel manufacturer; it can be used on plain acoustic panels produced by many different manufacturers;
3. It is simple and quick to apply;
4. It provides a fastener which is almost entirely hidden, with only minimal disturbance of the front of the panel; and
5. It allows a panel to be removed and replaced.

The present invention, as with that of my aforesaid '130 application, provides a fastener for attaching a rear face of a panel of semi-rigid material to a substrate, in which the fastener comprises:

an anchor part for attachment to the substrate surface;

a screw part having an inner end connected to the anchor part so as to be rotatable relative to the substrate, the screw part having a helical member with an outer end capable of penetrating the rear face of the panel upon rotation of the screw part;

drive means for rotating the screw part including an elongated drive rod arranged to engage an outer end portion of the screw part.

The drive rod is capable of extending through the panel when the helical member contacts the rear face of the panel so that the drive rod is accessible at the front face of the panel to cause the helical member to rotate and penetrate the rear face of the panel and to become embedded in an inner portion of the panel to secure the panel onto the substrate. The drive rod is removable after the panel has been secured, and this drive rod is a small fraction of the diameter of the screw part so as to require only a small hole in the panel, and so that the fastener is essentially concealed within the panel.

It will be understood that the screw part used in accordance with this invention is fundamentally different from screw devices hitherto known to me. It has a large diameter helical member or flange, similar to that of an auger, the helical member or flange being preferably well over an inch in diameter. Unlike the kind of screw part shown by Lien, it can penetrate the rear face of a panel without any prior preparation of the panel, and for example it can penetrate and engage an unapertured panel. It is also unlike all screws known to me, except that of Lien, in being driven, not from its head, but from the other or "tail" end, i.e. the end that first penetrates the semi-rigid material. This is achieved by use of the drive rod which projects from the outer end of the screw part and passes through the panel material and is accessed from the front face of the panel.

The drive rod may be a non-circular rod or pin, for example a hexagonal rod, which engages in a non-circular recess in the outer end of the screw part, and which can be pulled out of the recess when the panel has been installed. Alternatively, the drive rod may be formed integrally with the screw part, for example being formed of plastic, and may be broken off when the panel has been installed. It may have a pointed outer end for penetrating the panel.

Preferably, the screw part includes a shaft rotatably held by the anchor part, and a helical member surrounding the shaft. The helical member has a diameter greater than the length of the screw part; in fact the diameter of the helical member is usually more than twice the shaft length. The drive rod has a diameter such that the bore formed in the panel is not noticeable when the drive rod is withdrawn. The drive rod has a diameter which is a small fraction (say less than ¼) the screw part diameter, being preferably less than ⅛ of an inch, and less than ⅛ the maximum diameter of the helical member, and most preferably less than ¹⁄₁₆ of this maximum diameter. These diameters of course also apply to the non-circular recess which receives the drive rod.

The term "helical member" covers not only an auger-type flight but may include a helical rod surrounding a shaft, and having an inner end connected to the shaft and a pointed outer end, operating somewhat in the manner of a corkscrew.

The anchor part may be a plate having at least one hole for screw attachment of the plate to the substrate. The plate may be firmly secured to the substrate, and preferably has at least one lug extending perpendicularly therefrom and capable of penetrating the rear face of the panel to stabilize the position of the panel.

Alternatively, the anchor part may be simply a wood-type screw or fastener fixed to the substrate and which rotatably receives an inner end portion of the screw part, this portion being rotatably held by the head of the anchor screw. This inner end portion may be a base member attachable to an outer or complementary member. Here, the base member has a bore for receiving the anchor screw and is attachable to the substrate while the base member is detached from the outer or complementary member. This construction allows the outer or complementary member to be attached to the base member after the latter has been attached to the substrate by the anchor screw, and this in turn means that the anchor screw may be co-axial with the drive rod, allowing for accurate positioning of the panel, as will be described fully below. It also means that the recess in the outer or complementary member which receives the drive rod may be of smaller diameter than the head of the anchor screw, unlike the situation in Lien referred to above.

One method of using the device, as described in my previously filed '130 application as aforesaid, involves firstly attaching anchoring means to the substrate so as to rotatably hold the screw part, and then inserting the drive rod into the non-circular recess in the outer end of the screw part. The panel is then pushed onto the drive rod which has a sharpened outer end so that it penetrates the panel and emerges from the front of the panel, where it is rotated by a tool to turn the screw part and draw this into the rear of the panel until the panel is secure.

While this procedure works, it has the drawback that precise positioning of the panel may be difficult. The drive rod needs to be inserted into the rear of the panel while this is still separated from the substrate by at least the length of the screw member and the drive rod, so that care and judgement is required if the panel is to be correctly positioned in its final location.

In accordance with another aspect of the present invention, an improved procedure is provided whereby a panel can be more precisely positioned than using the method described in my aforesaid '130 application. The present invention also provides a modified fastener device particularly suited to the new method. The new method can however also be used with certain of the fastener devices described in my aforesaid '130 application.

The improved procedure makes use of a fastener in which the screw part is rotatably attached to the substrate by an anchor screw which is co-axial with the non-circular drive recess in the outer end of the screw part and therefore also co-axial with the drive rod, and, generally, co-axial with the screw part. This allows the location of the anchor screw to be aligned with a bore in the panel which is preformed before the drive rod is put in place, rather than being formed by the drive rod upon being pushed through from the panel rear face, as in my aforesaid '130 application.

Constructions of the fastener device in which an anchor screw is co-axial with the screw part and its drive means were shown in my aforesaid '130 application. The present application shows a further, preferred design for co-axial anchor screw and drive rod having additional desirable features. In all these designs, in order to allow insertion of the anchor screw, the screw part is separable into a base member and an outer or complementary member, the base member being attached to the substrate by the anchor screw while separated from the outer or complementary member.

The fastener device in accordance with this aspect of the invention may be defined as comprising:

a screw part having an inner end capable of being rotatably held relative to the substrate by an anchor screw having a head, the screw part having a helical member with an outer end capable of penetrating the rear face of the panel upon rotation of the helical member;

drive means for rotating said screw part, the drive means including a non-circular drive recess accessible from an outer end of the screw part and suitable for engagement by a drive rod which is capable of extending fully through a transverse bore in the panel so that the drive rod is accessible for rotation at the front face of the panel to cause the helical member to penetrate and engage a rear portion of the panel, and which rod is removable from the screw part after the panel has been secured so that the fastener is essentially concealed within the panel;

the screw part including a base member and a complementary member, the base member having an aperture for receiving the anchor screw and being attachable to the substrate by the head of the anchor screw while the base member is separate from the complementary member, the complementary member being attachable to the base member when the anchor screw is in place in the base member aperture, said complementary member providing the non-circular drive recess for the drive rod, the base member being rotatable about the axis of the anchor screw when the anchor screw is in place in the substrate;

and wherein the axis of the base member aperture which receives the anchor screw is coincident with the axis of the non-circular drive recess for the drive rod in the complementary member when the two members are assembled together, whereby the bore in the panel which receives the drive rod may be co-axial with the anchor screw.

The base member may include the helical member and the aperture for receiving the anchor screw, and may have a central socket leading to the aperture for the anchor screw. The complementary member may be an insert engageable in the central socket and which has the non-circular recess for receiving the drive rod. This is the preferred arrangement of this present invention. The central socket is non-circular, and the insert has an outer surface which fits non-rotatably into the central socket. In the preferred embodiment in accordance with this present invention, the insert is connected to the base member by a flexible hinge part which allows the insert to be removed from the base member while the anchor screw is being inserted into the base member aperture.

In alternative arrangements, the complementary member includes the helical flight and has screw threaded attachment to the base member.

The invention also provides a method for attaching the rear of a panel of semi-rigid material to a substrate at a desired installation position by making use of a screw part having an inner end capable of being held relative to the substrate by an anchor screw having a head, such that the screw part can rotate relative to the substrate about an axis coaxial with the anchor screw, the screw part having a helical member with an outer end capable of penetrating the rear of the panel upon rotation of the helical member, the screw part comprising a base member and a complementary member, the base member having an aperture for the anchor screw and the complementary member having a non-circular drive recess for a drive rod which is co-axial with the anchor screw aperture when the two members are assembled together, the method comprising the steps of:

forming a transverse bore in the panel and marking an anchor screw location for the anchor screw in the substrate such that the anchor screw will be aligned with the transverse bore when the panel is in its desired installation position;

fixing the base member of the screw part to the substrate by means of the anchor screw inserted at the said location, with the anchor screw having a head engaging inside the aperture of the base member, whereby an inner end of said base member is rotatably held relative to the substrate by the anchor screw head;

fitting the complementary member of the screw part to the base member;

placing a panel at the installation position and passing an elongated drive rod through the said transverse bore in the panel and fitting an inner end of the drive rod into the non-circular drive recess of the complementary member so that a portion of the drive rod extends through the panel and has its outer end part protruding from a front face of the panel when the helical member of the screw part contacts the panel rear face, rotating the drive rod by its protruding end part to cause the helical member of the screw part to penetrate and engage a rear portion of the panel, and, upon further rotation of the screw part, to secure the panel onto the substrate, and removing the drive rod from the outer end of the screw part after the panel has been secured so that the fastener is essentially concealed within the panel.

Marking the locations for the anchor screw hole and making the transverse bores in the panel may be done simultaneously by holding the panel in a position in which it is to be installed while forming each bore in the panel by use of a penetrating tool inserted from the front face, which tool at the same time also marks an anchor screw location in the substrate, so that the anchor screw locations are aligned with the bores.

Alternatively, the making of the bores in the panel and the marking of locations for the anchor screws may be done separately by using a template, or other measuring means, to ensure that the anchor screws are located correctly relative to the bore positions for the panel to be properly positioned.

The drive rod may be a non-circular rod or pin, for example a hexagonal rod, which engages the non-circular drive recess in the screw part, and which can be pulled out of the recess when the panel has been installed. With this method it is possible to use a standard Allen key or wrench as the drive rod, since its outer end does not need to pass through the panel. Also, the two-member screw part allows the use of a drive rod which is much smaller in diameter than the head of the anchor screw, unlike in Lien.

BRIEF DESCRIPTION OF THE DRAWINGS

Preferred embodiments of the invention will now be described by way of example with reference to the accompanying drawings, in which.

DETAILED DESCRIPTION

FIGS. 1 to 4 show a first form of device in accordance with the invention which can be used in association with other like devices to attach an acoustic panel P to a substrate S. Typically, 6 of the fastening devices would be used for a 4 foot by 8 foot panel.

As shown in FIGS. 1 to 4 an anchor part 10 has screw holes 11 for anchor screws 12, similar to conventional wood screws, by which it is attached to a substrate S, which is typically an interior wall. The anchor part 10 is formed of a strip of metal, having pointed end portions 10a or lugs which project outwardly perpendicularly from the main central plate 10b of the strip, and having a raised central portion or platform 10c with a central hole 16. The raised platform and hole 16 provide a bearing with an axis perpendicular to the substrate, which bearing rotatably receives the inner end of a shaft 20 of the screw part 22 which projects outwardly from the platform 10c, the shaft being rotatably held in place by retaining screw 24 engaging a bore in the inner end of the shaft and having its head bearing against by the underside of the platform 10c.

Figure 3:
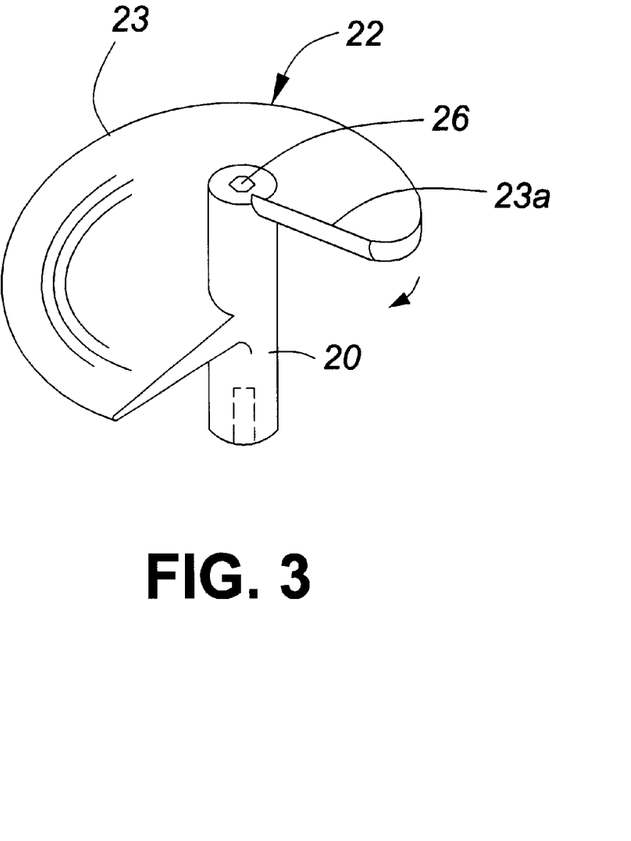
FIGS. 3 and 4 are perspective views respectively of the screw part and the anchor part of the fastener of FIGS. 1 and 2.
Figure 4:
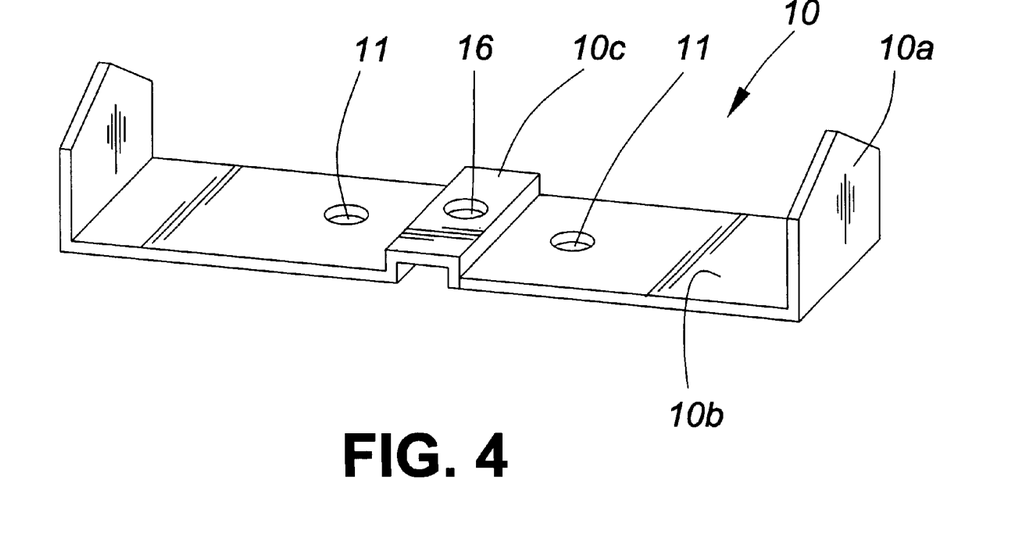

The screw part 22, shown separately in FIG. 3, is molded of plastic material, for example 30% fiber filled Nylon, or is die cast zinc, and has a helical member 23 or flight partly surrounding the central shaft 20; the member extends about 270° around the shaft. The helical member is wide relative to its length, its diameter (shown at "Dia." in FIG. 1) being much greater than its length (shown at L in FIG. 1), and preferably greater than twice its length. A suitable diameter is between 1½ to 2 inches, and a suitable length for the helical member is about ½ to ⅝ inches. The outer or leading edge 23a of the helical member is sharpened and curves outwards from the adjacent thread portion so as to "bite" into the semi-rigid panel material, which requires no previous preparation to be engaged by the screw part.

Figure 1:
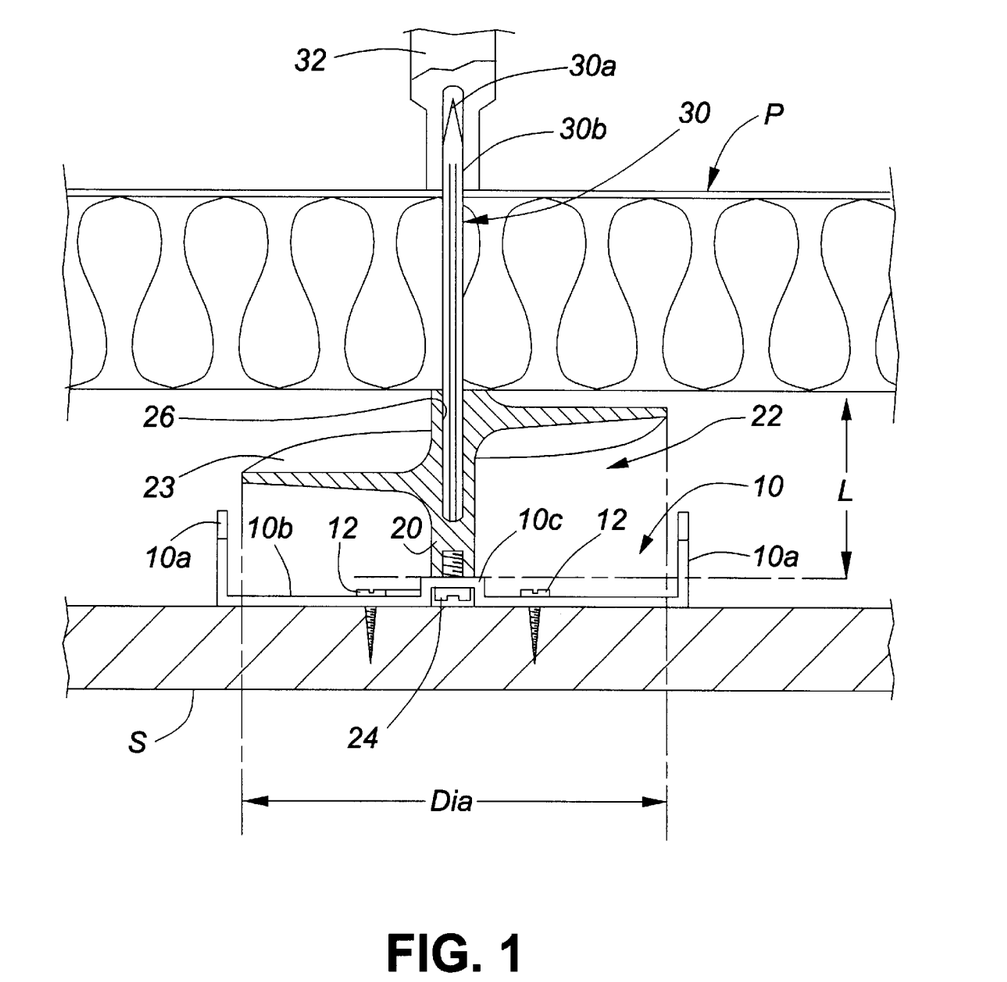
FIG. 1 shows a fastening device in accordance with the invention fixed to a substrate and in the initial stages of engagement with a panel.

The outer end of shaft 20, which roughly coincides with the outer end of the member 23, has a non-circular, e.g. hexagonal, recess 26 extending slightly more than one-half the shaft length. This receives a removable drive rod 30, sometimes referred to as a "turning pin", in the form of a hexagonal rod of about 3/32 inches diameter (i.e. across its opposite flat surfaces). The drive rod has a pointed outer end 30a, and a length sufficient that, as shown in FIG. 1, when fully inserted into the shaft 20, it can penetrate an acoustic panel P which has been pushed onto the drive rod and still have a drive portion 30b protruding from the front of the panel. The panel is typically about 1 to 1⅛ thickness, and the length of rod projecting from the outer end of the screw is at least 1¼ inch and preferably about 1½ inch. Clearly, by lengthening the lugs and drive rod, panels of greater than 1 inch thickness can be installed using the same system.

Figure 2:
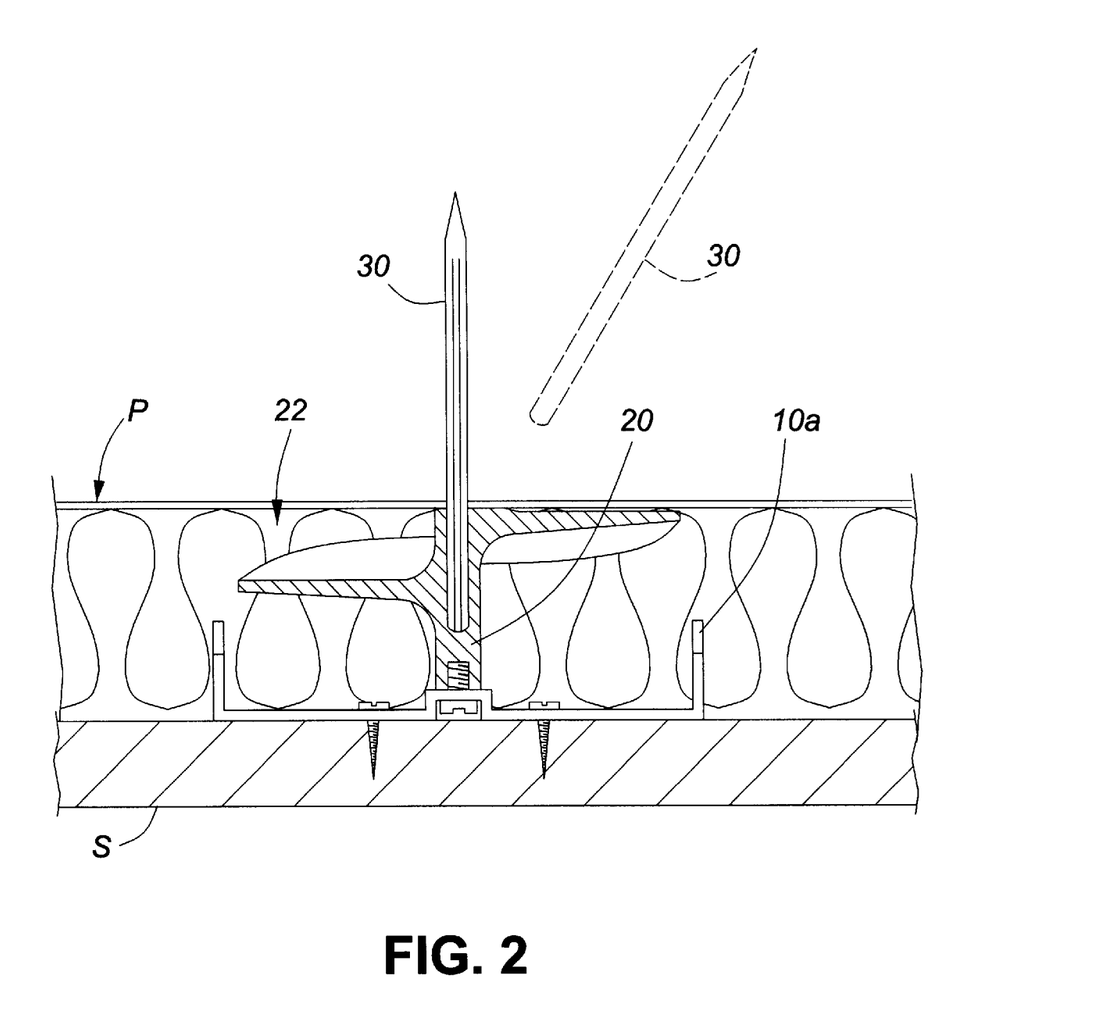
FIG. 2 shows the panel when fully secured to the substrate, with the drive means being withdrawn.

The fastener is applied using a tool such as is indicated at 32 in FIG. 1; this is similar to a screw driver but has an outer end with a hexagonal socket shaped to receive the outer end portion 30b of the rod 30. When the panel has been impaled on the rod 30 as shown in FIG. 1, and has been pushed into contact with the screw part, the tool is fitted onto the projecting end of the rod and rotated to turn the screw in such a direction as to cause the outer end 23a of the helical member to engage in the rear face of the panel and to draw the panel onto the screw. Suitable rotation of the drive rod 30 causes the screw part to become fully embedded in the interior of the panel as shown in FIG. 2, such that the outer end of the screw is close to the front surface of the panel. In the final stages of movement, the pointed lugs 10a enter the rear face of the panel; these assist in preventing lateral movement of the panel when it is fully installed. At this stage the tool and the drive rod 30 are removed, as indicated in FIG. 2, leaving only a small and unnoticeable hole at the front face of the panel no larger than the drive rod diameter.

The screw part as shown in FIGS. 1 to 3 has a "left-hand" thread 23; this means that if it were to be applied by rotation from the usual or "head" end of the screw, i.e. that end attached to the anchor member, it would require counter-clockwise rotation to engage the panel. However since it is being rotated from, in effect, the tail end of the screw it is applied using normal clockwise rotation of the tool 32.

The fastener described is largely hidden when installed, leaving only a small hole at the front of the panel. The fastener holds the panel strongly enough to be used on a ceiling panel, and does not require glue.

The fastener also allows a panel to be removed and replaced with little damage to the panel. Although the screw part is completely hidden inside the installed panel, its position is detectable since it is close to the panel outer surface, typically within say ⅛ inch of the surface, and its hardness can be felt by a person running his hands over the slightly compressible panel. The rod 30 can then be inserted into the screw member 20 with the pointed end 30a innermost. The tool 32 is applied to the outer end of the rod and rotated in a counterclockwise direction to unscrew the screw member from the panel, so pushing it away from the substrate and off the lugs 10a.

Figure 5:
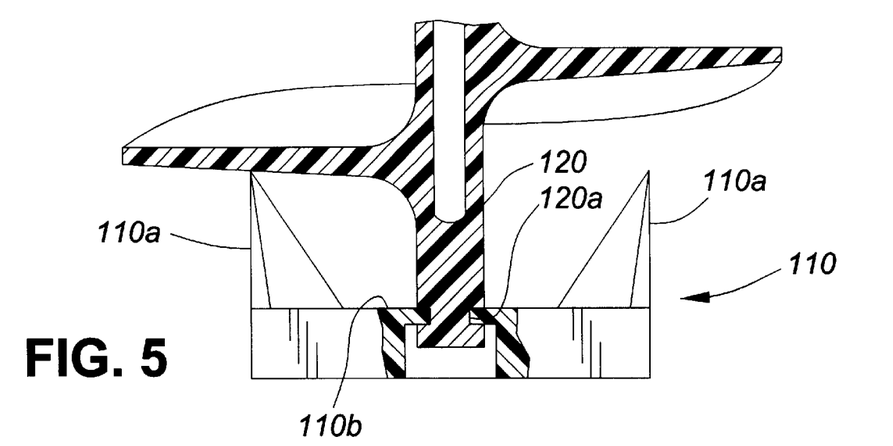
FIG. 5 is a partly sectioned side view of another embodiment of the anchor part and screw part.
Figure 6:
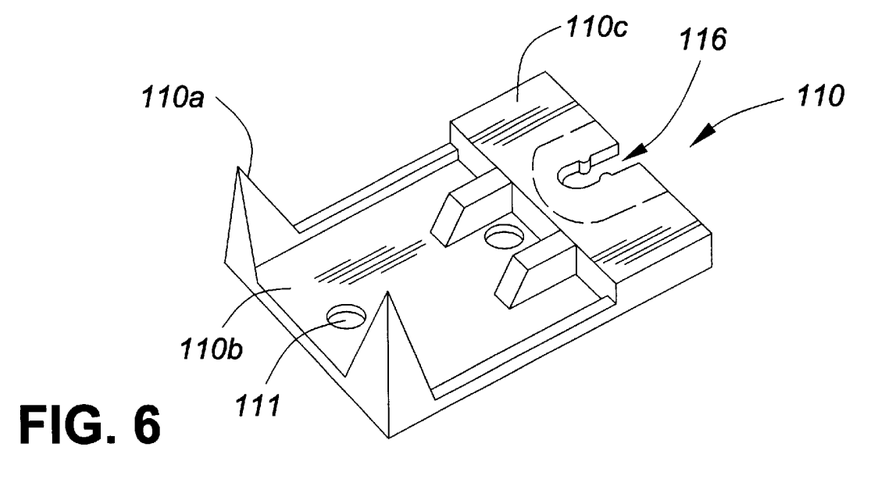
FIGS. 6 and 7 are perspective and plan views of the anchor part as shown in FIG. 5.
Figure 7:
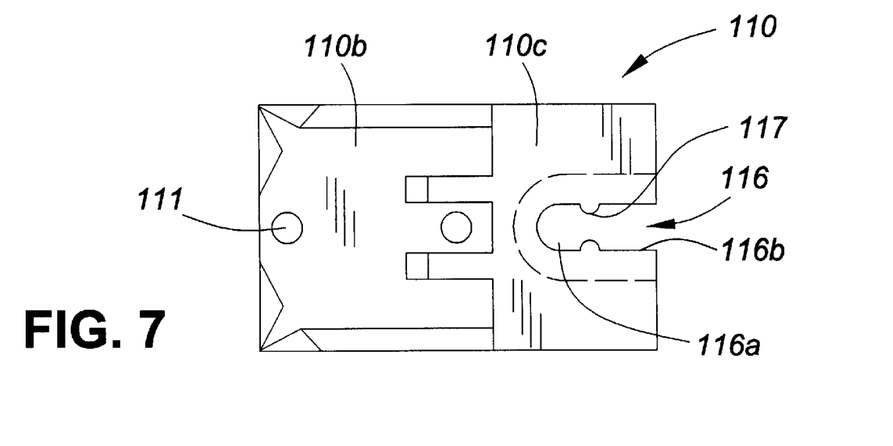

FIGS. 5 to 7 show an alternative version of the invention which is wholly made of plastic material, for example by injection molding. The anchor part 110, shown separately in FIGS. 6 and 7, has a spaced apart pair of lugs 110a at one end, a central plate part 110b which can lie flat against a substrate and having holes 111 for anchor screws, and a raised platform portion 110c at the end opposite lugs 110a with an aperture 116 which provides a bearing for the screw shaft 120. The aperture 116 is in the form of a slot having a part-circular end portion 116a which provides a bearing for an end portion of the screw shaft 120, and a lead-in portion 116b separated from inner portion 115a by opposed detents or lugs 117. The inner end of the screw shaft 120 has an annular recess 120a, seen in FIG. 5, which can be snapped past the lugs 117 and into the end portion 116 where it is retained by the resilience of the plastic lugs 117. The aperture portion 116 thus provides a bearing for the screw shaft having an axis perpendicular to a substrate surface. Clearly, this embodiment of the invention can be produced more cheaply, and assembled more easily, than that of FIGS. 1 to 4.

FIGS. 8 to 11 show a further form of the device in accordance with the invention which allows accurate positioning of the panel to be achieved more easily than with the devices described above.

Figure 8:
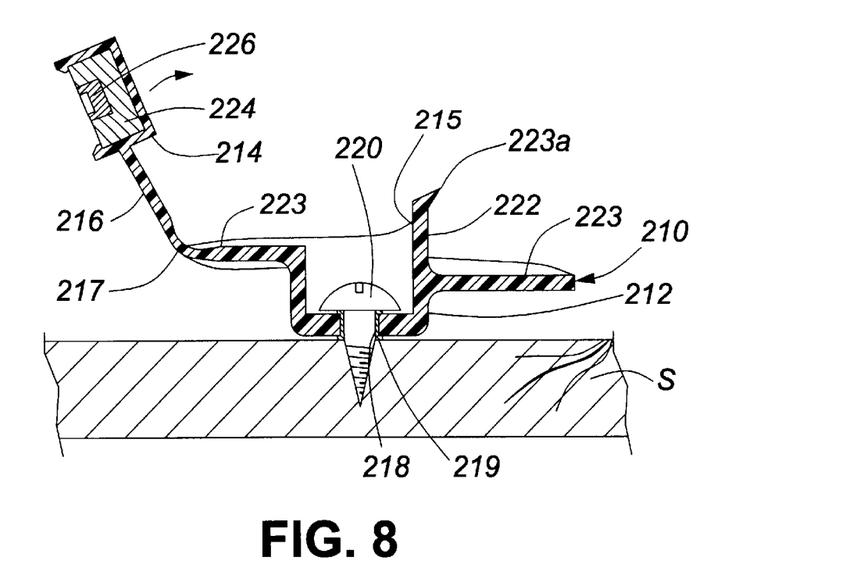
FIG. 8 is an axially sectioned side view of a modified screw component of this invention fixed to a substrate.
Figure 9:
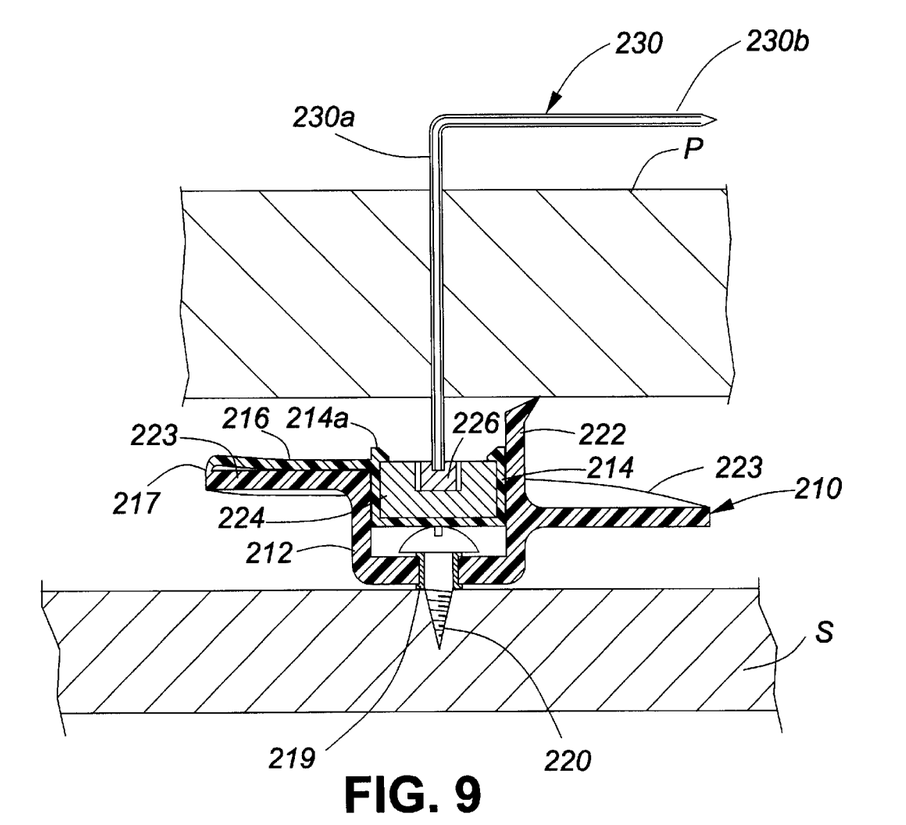
FIG. 9 shows the same parts of FIG. 8 when the fastener is fully assembled and is in position for the initial stage of engagement with a panel.

As shown in FIGS. 8 to 11 the screw part 210 is formed of two members namely a base member 212 and a complementary member 214, the latter being in the form of a hexagonal cup which fits non-rotatably into a non-circular, specifically hexagonal, socket 215 in the base member. As indicated in FIG. 8, major parts of these members are integrally molded as one component; suitable plastic material for these molded parts is polypropylene. The members are attached by an integral flexible strip 216 having a thinned central hinge portion 217 which allows the complementary cup member 214 to be initially removed from the base member 212 and to be later inserted into the socket 215. At the base of the socket is a circular aperture 218, surrounded by a metal grommet 219, for an anchor screw 220 which is shown in FIGS. 8 and 9, and which can be inserted into the aperture, to engage the substrate S, while the cup member 214 is removed from the socket 215. The anchor screw 220 is an ordinary wood screw having a head suitable for engaging the interior of the socket 215 to hold the screw part in place on the substrate while allowing it to rotate about the axis of the anchor screw. The metal grommet 219 allows for easy rotation without tendency to tighten or loosen the anchor screw.

The base member 212 of the screw part has a helical flight 223 partly surrounding a central shaft 222; the flight extends about 270° around the shaft and has outer end 223*a*. As before the helical flight is wide relative to its length, its diameter being much greater than its length, and preferably greater than twice its length. The shaft 222 and a main part of the flight 223 are generally co-axial with the anchor screw aperture 218.

Figure 10:
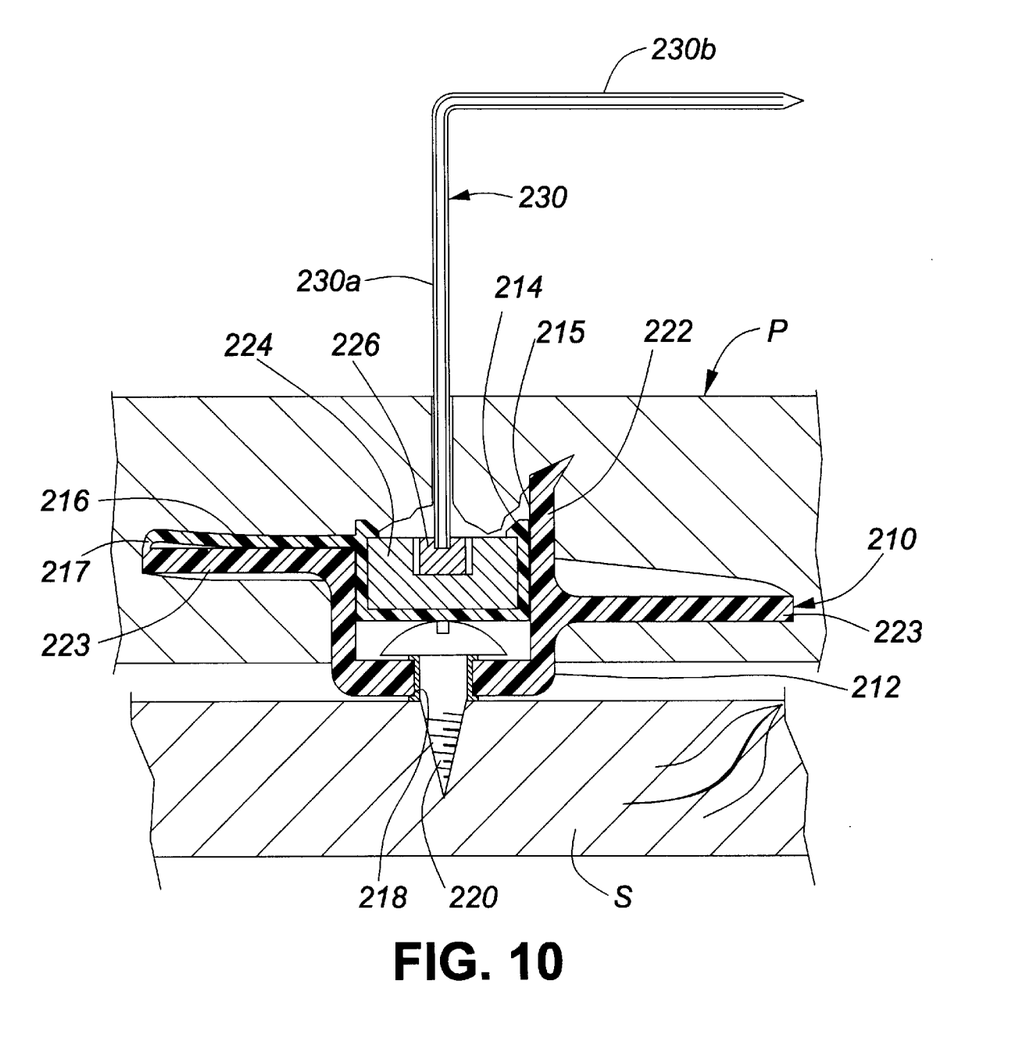
FIG. 10 is a view of the same parts as FIG. 9 but with the panel approaching its final position.
Figure 11:
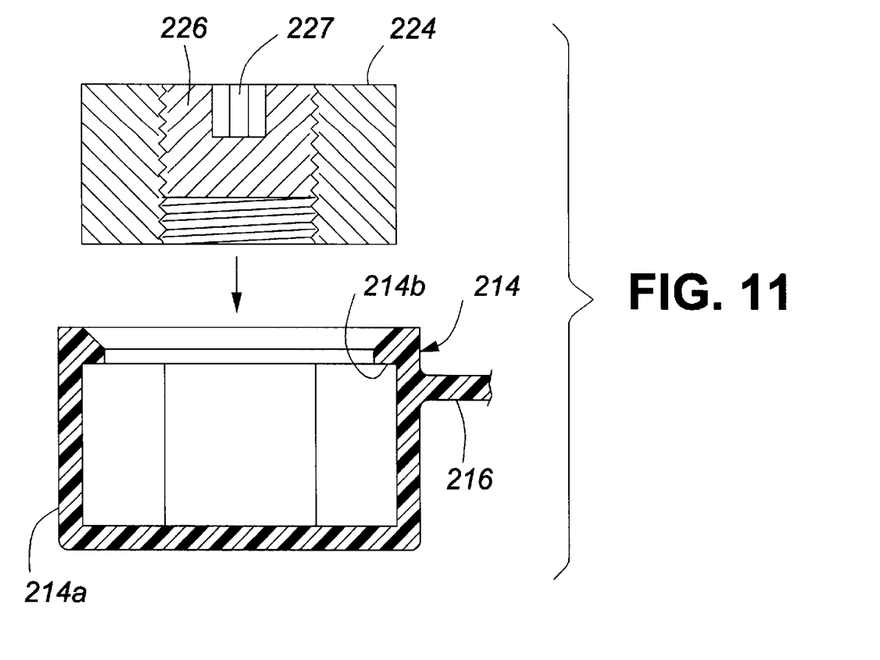
FIG. 11 is an exploded sectional elevation of the complementary member of the screw part of FIGS. 8 to 10.

The plastic cup 214 has a hexagonal surrounding wall 214*a* which non-rotatably receives a hexagonal metal nut 224; the nut is a press fit into the cup and is retained by detent lips 214*b* shown in FIG. 11. This nut may be a standard off-the-shelf component, and has an internal thread into which is fixed a set screw 226, shown in FIG. 11, also an off-the-shelf component, having a hexagonal drive recess 227 suitable for receiving a removable hexagonal drive rod 230. This drive rod 230 may be a standard Allen key of about 3/32 inches diameter (i.e. across its opposite flat surfaces). However, in one preferred form as shown in FIGS. 9 and 10, the drive rod is a modified "Allen" key having one long leg 230*a* of the usual Allen key form, and the other, mutually perpendicular, leg 230*b* extended and sharpened so as to act as a tool for piercing the panel and for marking the anchor screw position on the substrate. The drive rod leg 230*a* has a length sufficient that, as shown in FIG. 9, when a panel P is placed against the outside of the screw part 210, the drive rod can be inserted through a bore in the panel to engage the recess 227 of the complementary member 214 while the leg 230*b* of the drive rod, which is suitable for hand manipulation, remains outside the panel. The panel is typically about 1 to 1⅛ inch in thickness, and the length of drive rod leg 230*a* will be about 2 inches. Clearly, by lengthening the drive rod, panels of greater than 1 inch thickness can be installed using the same system.

Figure 12:
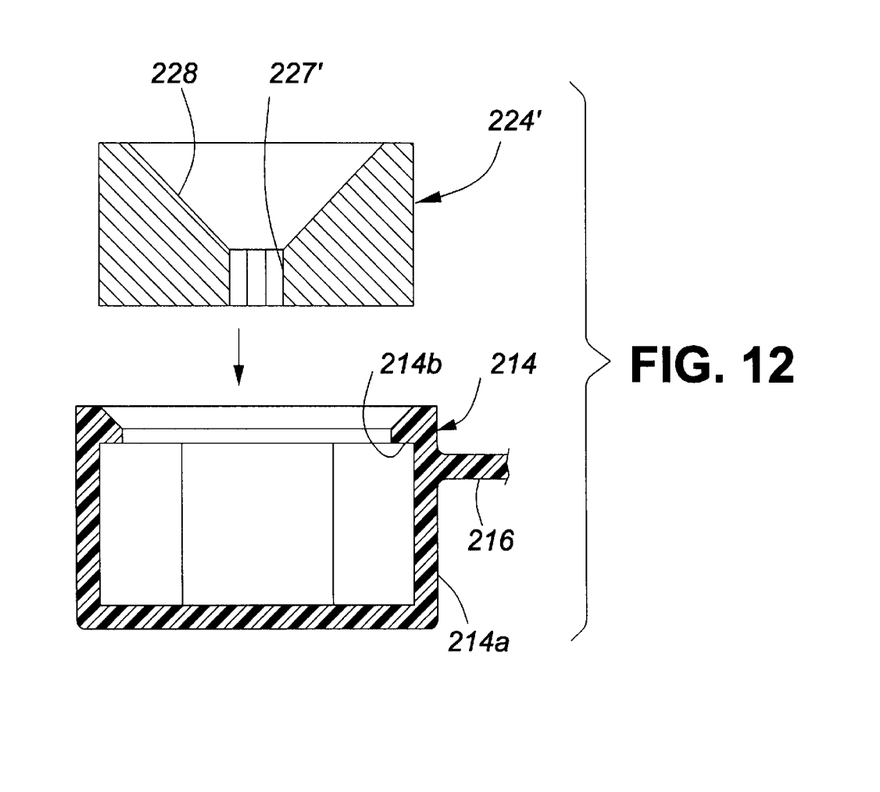
FIG. 12 is a view similar to FIG. 11 of a preferred form of the complementary member in accordance with this invention.
Figure 13:
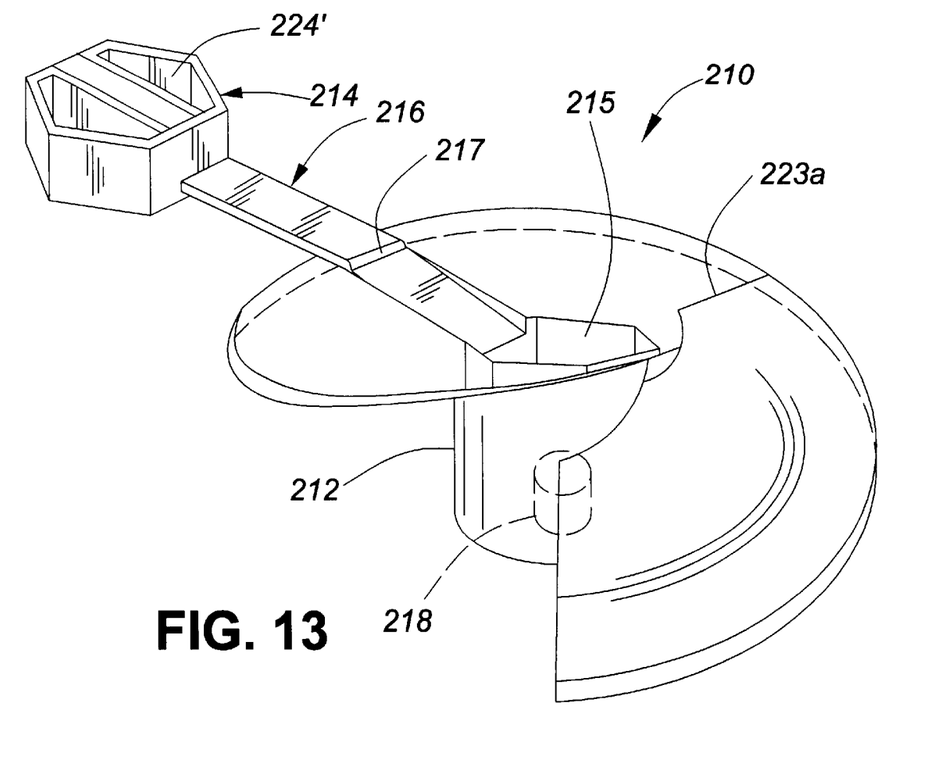
FIG. 13 is a perspective view of the main component of the preferred form of fastener in accordance with FIGS. 8 and 9.
Figure 14:
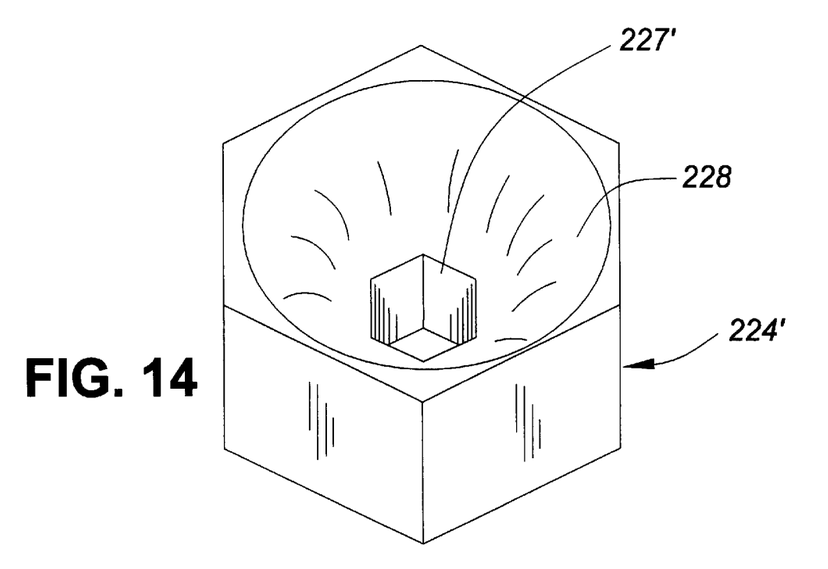
FIG. 14 is a perspective view of a component of the complementary member the fastener of FIG. 12.

FIGS. 12, 13 and 14 show a more preferred form of the screw part in which the metal nut 224', instead of being formed of two off-the-shelf parts assembled together, is an integral part die cast from zinc, and formed with the hexagonal drive recess 227'. This nut 224' also differs from that of the first embodiment by having the recess 227' at the base of a conical depression, the inwardly sloping sides 228 of which serve to guide the end of the drive rod towards the recess 227'. This nut fits into the same cup 214 as previously described.

In one method in accordance with the invention, the first step is to hold the panel P in the desired installation position while using a penetrating tool such as leg 230*b* of the drive rod 230 to form a bore in the panel for each screw device which is to be used. As each bore is made the tool is pushed in sufficiently to make a lead hole or indentation in the substrate S thus to provide an anchor screw location. The panel is then removed, and, at each anchor screw location, the base member 212 of a screw part 210 is secured to the substrate as shown in FIG. 8 by inserting the anchor screw 220 into the aperture 218 and into the anchor screw location in the substrate. The anchor screw is left just loose enough to allow the screw part to rotate; this is of course done with the cup member 214 removed as in FIG. 8. The cup member 214, complete with nut 224 or 224', is then inserted into the socket 215, as shown in FIG. 9, by bending strip 216 about hinge 217.

The panel is then placed in position, and a drive rod 230*a* is pushed through the appropriate bore which has been formed in the panel and into the drive member recess 227 (or 227' for the FIG. 12 version), as shown in FIG. 9. The panel is then pushed on to the screw part while the drive rod is rotated to turn the screw part in such a direction as to cause the outer end 223*a* of the helical flight to engage in the rear face of the panel and to draw the panel onto the screw. Suitable rotation of the drive rod causes the screw part to become embedded in the interior of the panel as shown in FIG. 10; in the final stages of movement the panel is securely in contact with the substrate and the outer end of the screw part is close to the front surface of the panel. At this stage the drive rod 230 is removed, leaving only a small and unnoticeable hole at the front face of the panel.

The screw part 210 as shown in FIGS. 8 to 11 has a "right-hand" thread or flight 223 which requires counter-clockwise rotation to engage the panel when, as described, it is rotated by drive rod 230 from what is, in effect, the tail end of the screw part. This may be preferred since it has been found that in some cases rotation in the opposite sense tends to tighten the anchor screw 220 and to prevent further rotation. However, use of the eyelet 219 may allow friction with the anchor screw to be reduced so that the more convenient clockwise rotation of a left-hand threaded screw part is possible.

While FIGS. 9 and 10 show an angled tool 230, it may be preferred to use a straight tool having a plastic handle and having a pointed, tapered outer end portion which serves as a penetrating tool for the panel, this end portion being short enough that when inserted into the non-circular recess such as 227 or 227' it allows the adjacent hexagonal surface of the tool to drivingly engage the recess.

Figure 15:
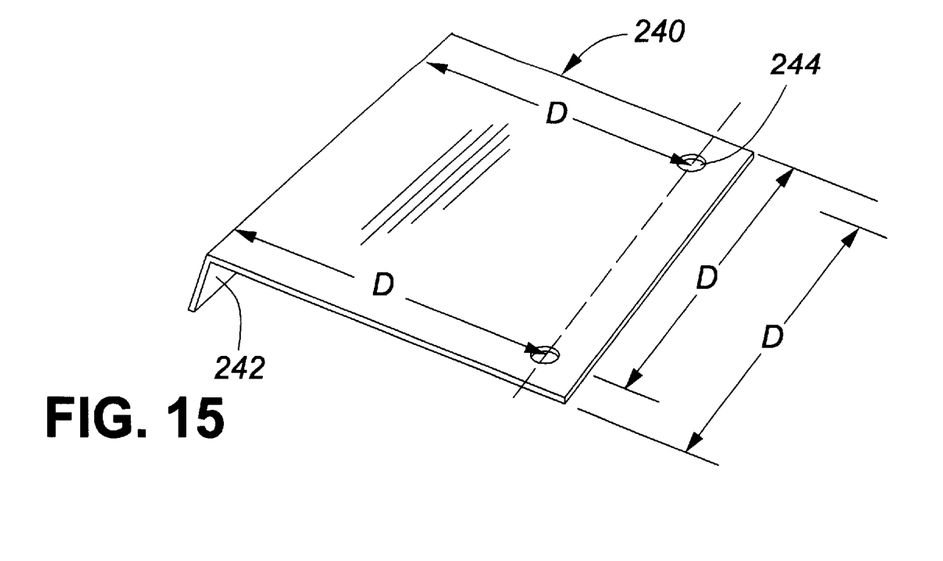
FIG. 15 is a perspective view of a simple template which can be used to position bores and anchor screw locations in accordance with the invention.
Figure 16:
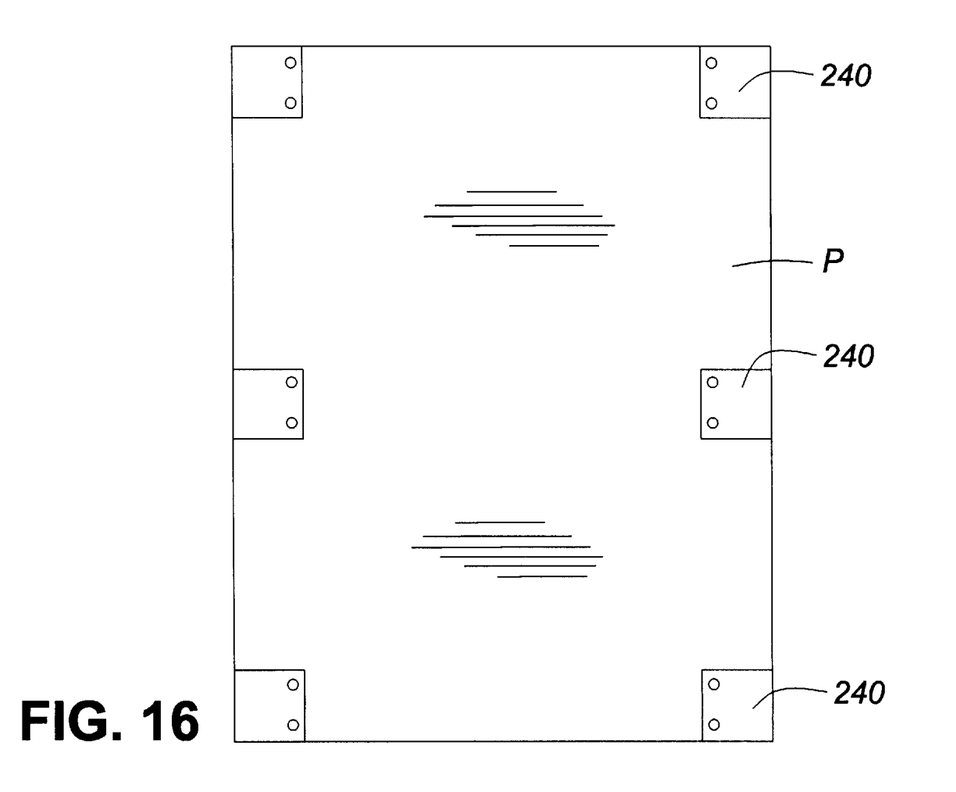
FIG. 16 is a view of a panel indicating the use of a template of FIG. 15 for positioning bores.

This method may not work well when the panel is applied to hard surfaces which cannot easily be indented or marked by a pointed hand tool such as leg 230*b* of the tool described. In this case it may be necessary to use a template for setting the anchor screw locations and those of the bores in the panel; a suitable template is shown in FIGS. 15 and 16. As shown best in FIG. 15, the template 240 is a simple plate, for example of cardboard, having a flange 242 along one edge, and having two holes 244 spaced a distance "D" from the flange edge of the template, and being also separated by the same distance "D"; the distance "D" is suitably 5 inches. The template may be used as shown in FIG. 16 at corners of a panel to locate bores the distance "D" from the two adjacent sides, by holding the flange 242 against one adjacent side while aligning an adjacent edge of the template with that of the panel. Four bores for fasteners adjacent the corners may be sufficient for a 4 foot by 4 foot panel, but for a larger panel which requires 6 fasteners, such as illustrated in FIG. 16, additional bores will be made near to the centers of the longer sides. For these, the template will provide only the distance "D" from the sides; the positions of the template on these longer sides must be determined by measurement.

After (or before) the bores in the panel have been made by the template, the panel is placed into the desired position on the substrate and the perimeter is marked out. The panel is then removed and the template 40 used again to mark the anchor screw positions which correspond to bores made (or to be made) in the panel. The fasteners and panel are then applied as before.

The fastener described is largely hidden when installed, leaving only a small hole, commensurate with the diameter of the drive rod, at the front of the panel. It will be noted that the drive rod has a diameter much less than that of the anchor screw head, e.g. less than ⅓ this diameter; something which is not possible with the Lien design referred to above. The fastener holds the panel strongly enough to be used on a ceiling panel, and does not require glue.

The fastener also allows a panel to be removed and replaced with little damage to the panel. Although the screw part is completely hidden inside the installed panel, its position is detectable since it is close to the panel outer surface, typically within say ⅛ inch of the surface, and its hardness can be felt by a person running his hands over the slightly compressible panel. Conveniently, the template 240 can also be used to locate the position. The rod 230a can then be inserted into the screw member recess 227 and rotated in a clockwise direction to unscrew the screw member from the panel, so pushing it away from the substrate. This operation is facilitated by the use of the nut 224' shown in FIGS. 12 and 14 since the indented sides 228 guide the drive rod into the recess 227'.

Figure 17:
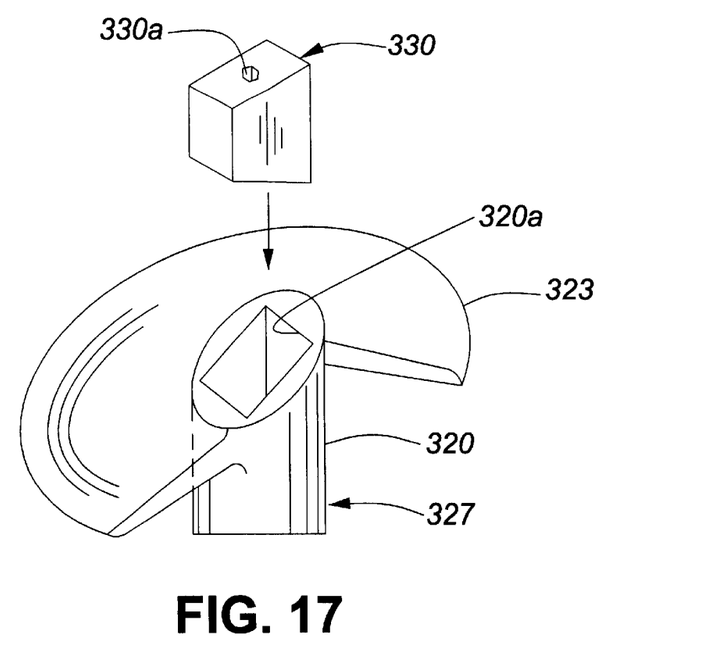
FIG. 17 is a perspective view of two components of another screw part in accordance with the invention.
Figure 18:
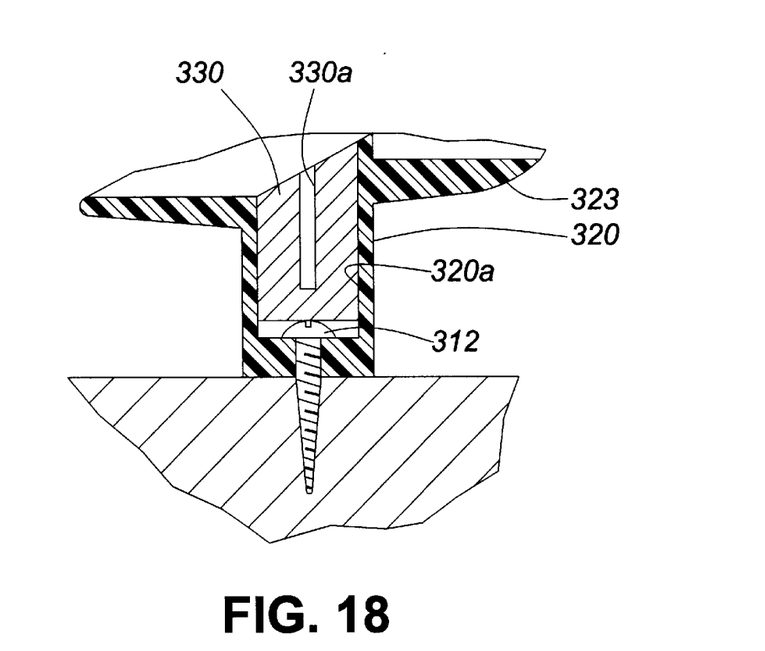
FIG. 18 is a sectional elevation of the FIG. 17 screw part when attached to a substrate by an anchor screw.

FIGS. 17 and 18 show another construction in which the screw part is formed of two members, namely base member 327 and a complementary outer member 330, the base member 327 again including the main parts of the screw part namely shaft 320 and the helical flight 323. The outer end of shaft 320 has a deep socket 320a of non-circular, specifically square, cross section, for reception of the outer member 330 which is in the form of an insert having an outer surface of square cross-section providing an interference fit into the recess, and an axial bore 330a of hexagonal cross-section for the drive rod. The anchor screw 312 is inserted into the recess 320a while the base member is still detached from the outer member. Preferably, the base member 327 is molded of plastic, and the insert or complementary member 330 is die cast metal.

Figures 19, 20, 21:
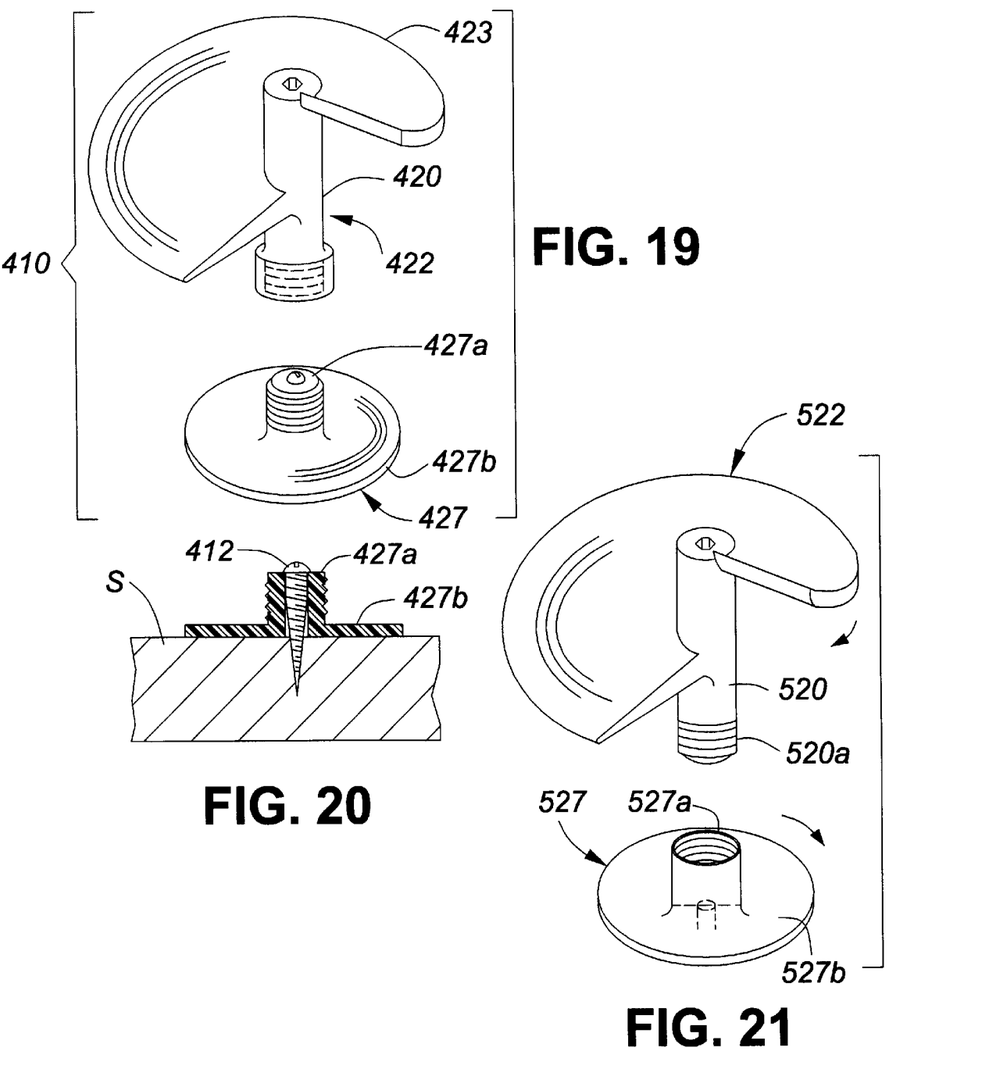
FIG. 19 is a perspective view of components of a further screw part.
FIG. 20 is a sectional elevation of the base member of the screw part of FIG. 19, as attached to a substrate.
FIG. 21 is a perspective view of yet another embodiment of screw part in accordance with the invention.

FIG. 19 shows an exploded view of another embodiment in having an anchor screw 412, and in which the main screw part 410 is formed of two members, including a base member 427 and an outer member 422, the base member being attachable to the substrate before the outer member is attached to the base member.

As shown in FIG. 19, the screw part 422 has helical flight 423 surrounding shaft 420, the shaft having an inner end with an internal recess which is threaded to receive the threaded boss 427a of a detachable base member 427. As shown in FIG. 19, this base member has a flange 427b which provides a flat bearing surface rotatable in contact with the substrate S to maintain the proper orientation of the screw part, i.e. with its axis normal to the substrate. The base member 427 is fixed to the substrate by an anchor screw 412 which passes through a central bore in the base member and engages the top of the boss 427a; the anchor screw is put in place while the base member is detached from the main screw part 422, and is left sufficiently loose for the base member to rotate in contact with the substrate. Subsequently, the screw part 422 is threaded onto the boss 427a.

Figure 22:
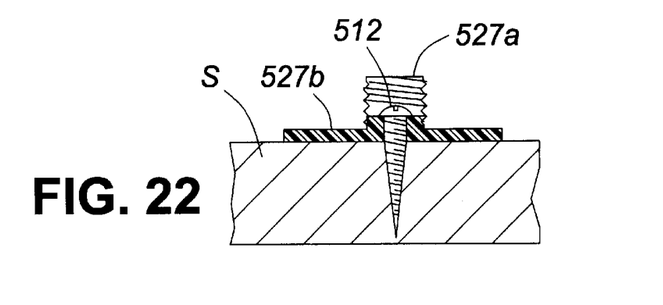
FIG. 22 is a view similar to FIG. 20 of the base member of the FIG. 21 embodiment.

FIGS. 21 and 22 show a construction similar to that of FIGS. 19 and 20 in which the screw part 522 has a detachable base member 527 to which it may be attached by external screw threads 520a on the inner end of the shaft 520 and internal screw threads on a central boss 527a of the base member. While the parts are detached, the base member is rotatably attached to the substrate S by the anchor screw 512 which fits within a recess in the boss 527a, the screw 512 being left sufficiently loose for the base member to rotate with the rest of the screw part 522. The flat underside of the base member flange slides on the substrate S and maintains the desired orientation of the screw part.

I claim:

1. A fastener device for attaching a rear face of a panel of semi-rigid material to a substrate, comprising:

an anchor part for attachment to the substrate;

a screw part having an inner end adapted to be held by said anchor part in such manner as to be rotatable relative to the substrate when said anchor part is attached to said substrate, said screw part having a helical member with a leading edge capable of cutting into semi-rigid material, whereby an outer end of said screw part is capable of penetrating the rear face of a said panel upon rotation of said helical member;

drive means for rotating said screw part, said drive means including a non-circular recess open to an outer end of said screw part and suitable for engagement by a non-circular end of a drive rod extending through a transverse bore in the panel, such that rotation of the drive rod at the front face of the panel can cause the helical member to penetrate and engage a rear portion of the panel, said drive means allowing removal of the drive rod from said screw part after the panel has been secured so that the fastener is essentially concealed within the panel;

said non-circular recess being sized to allow engagement and rotation by a drive rod having a diameter which is less than 1/8 the diameter of said helical member so as to require only a similarly small diameter bore in the panel, whereby the fastener is essentially concealed within the panel after removal of the drive rod.

2. A fastener according to claim 1, wherein said non-circular recess is engageable and rotatable by a drive rod less than ¹⁄₁₆ the maximum diameter of the helical member.

3. A fastener according to claim 1, wherein the helical member of the screw part has a diameter greater than one inch.

4. A fastener according to claim 1, wherein the helical member of the screw part has a diameter greater than 1½ inches.

5. A fastener according to claim 1, wherein said non-circular recess is rotatable and engageable by a drive rod having a diameter less than ⅛ inch.

6. A fastener according to claim 1, wherein the screw part includes a base member and a complementary member, said complementary member having said non-circular recess, said base member having a bore for receiving said anchor screw and being attachable to the substrate while the base member is separated from the complementary member, said base member having a surface rotatable while in contact with said substrate surface.

7. A fastener device for attaching a rear face of a panel of semi-rigid material to a substrate, comprising:

an anchor part for attachment to the substrate;

a screw part having an inner end adapted to be held by said anchor part in such manner as to be rotatable relative to the substrate when said anchor part is attached to said substrate, said screw part having a helical member with an outer end capable of penetrating the rear face of a said panel upon rotation of said helical member;

drive means for rotating said screw part, said drive means including a non-circular recess open to an outer end of said screw part and suitable for engagement by a non-circular end of a drive rod extending through a transverse bore in the panel, such that rotation of the drive rod at the front face of the panel can cause the helical member to penetrate and engage a rear portion of the panel, said drive means allowing removal of the drive rod from said screw part after the panel has been secured so that the fastener is essentially concealed within the panel;

said non-circular recess being sized to allow engagement by a drive rod having a diameter which is a small fraction of the diameter of said helical member so as to require only a similarly small diameter bore in the panel, whereby the fastener is essentially concealed within the panel after removal of the drive rod, and wherein the helical member has a diameter greater than the length of the screw part.

8. A fastener according to claim 7, wherein the helical member of the screw part has a diameter greater than twice the length of the screw part.

9. The combination of a panel of semi-rigid material and a fastener device for attaching a rear face of said panel to a substrate, said fastener device comprising:

an anchor part for attachment to the substrate surface;

a screw part having an inner end adapted to be held by said anchor part in such manner as to be rotatable relative to the substrate when said anchor part is attached to said substrate, said screw part having a helical member with an outer end capable of penetrating the rear face of a said panel upon rotation of said helical member;

drive means for rotating said screw part, said drive means including an elongated drive rod arranged to extend from an outer end portion of said screw part, said drive rod being removable from the screw part after the panel has been secured, said drive rod being capable of extending from said screw part through a bore in said panel when the helical member is in contact with the rear face of the panel so that the drive rod is accessible for rotation at a front face of the panel to cause the helical member to penetrate and engage a rear portion of said panel, and, upon further rotation of the screw part, to secure the panel onto the substrate, said drive rod having a diameter which is less than ⅛ the maximum diameter of said helical member so that said bore in the panel is of a similarly small diameter, whereby the fastener may be essentially concealed within the panel after removal of the drive rod.

10. A fastener device for attaching a rear of a panel of semi-rigid material to a substrate, comprising:

a screw part having an inner end capable of being rotatably held relative to the substrate by an anchor screw having a head, said screw part having a helical member with an outer end capable of penetrating the rear of the panel upon rotation of said helical flight;

drive means for rotating said screw part, said drive means including a non-circular recess open to an outer end of said screw part and suitable for engagement by a non-circular end of a drive rod extending through a transverse bore in the panel, such that rotation of the drive rod at the front face of the panel can cause the helical member to penetrate and engage a rear portion of the panel, said drive means allowing removal of the drive rod from said screw part after the panel has been secured so that the fastener is essentially concealed within the panel;

said screw part including a base member and a complementary member, said base member having an aperture for receiving the anchor screw and being attachable to the substrate by the head of the anchor screw while the base member is separate from the complementary member, said complementary member being attachable to the base member when the anchor screw is in place in the base member aperture, the base member being rotatable about the axis of the anchor screw while the anchor screw engages the substrate, the axis of the base member aperture which receives the anchor screw being coincident with the axis of the non-circular recess for the drive rod when the two members are assembled together, whereby the bore in the panel which receives the drive rod may be coaxial with the anchor screw;

and wherein said non-circular recess of the drive means is of smaller diameter than the head of said anchor screw.

11. A fastener according to claim 10, wherein said non-circular recess is engageable by a drive rod which has a diameter less than ⅛ the diameter of the helical member.

12. A fastener according to claim 10, wherein the helical member of the screw part has a diameter greater than one inch.

13. A fastener according to claim 10, wherein said base member includes the helical member of the screw part and has a central socket leading to said aperture for receiving the anchor screw, and wherein the complementary member is an insert engageable in said central socket and which has said non-circular recess for receiving said drive rod.

14. A fastener according to claim 13, wherein said central socket is non-circular, and wherein said insert has an outer surface which fits non-rotatably into said central socket.

15. A fastener according to claim 13, wherein said insert is connected to said base member by a hinge which allows the insert to be removed from the base member while said anchor screw is being inserted into the base member aperture.

16. A fastener according to claim 15, wherein said insert has a depression with inwardly sloping sides which lead to said non-circular recess.

* * * * *